US011532046B1

(12) United States Patent
Cecil

(10) Patent No.: US 11,532,046 B1
(45) Date of Patent: Dec. 20, 2022

(54) FIXED INCOME RECOMMENDER SYSTEM

(71) Applicant: Pre-Rec Inc., Jamaica Estates, NY (US)

(72) Inventor: Isaac Cecil, Jamaica Estates, NY (US)

(73) Assignee: Pre-Rec Inc., Jamaica Estates, NY (US)

( * ) Notice: Subject to any disclaimer, the term of this patent is extended or adjusted under 35 U.S.C. 154(b) by 0 days.

(21) Appl. No.: 16/738,708

(22) Filed: Jan. 9, 2020

Related U.S. Application Data

(63) Continuation of application No. 15/966,142, filed on Apr. 30, 2018, now abandoned.
(60) Provisional application No. 62/492,419, filed on May 1, 2017.

(51) Int. Cl.
*G06Q 40/04* (2012.01)
(52) U.S. Cl.
CPC ................... *G06Q 40/04* (2013.01)
(58) Field of Classification Search
CPC ..................................... G40Q 40/04
See application file for complete search history.

(56) References Cited

U.S. PATENT DOCUMENTS

| 8,438,096 B1 | 5/2013 | Fashenpour et al. |
| 2002/0095362 A1 | 7/2002 | Masand et al. |
| 2003/0004846 A1* | 1/2003 | Schneider ............... G06F 17/60 |
| 2018/0204283 A1* | 7/2018 | Halami .................. G06Q 40/06 |

OTHER PUBLICATIONS

Anderson, et al., in "Modern Pension Fund Diversification," from the Journal of Asset Management, in 2014 (Year: 2014).*

* cited by examiner

*Primary Examiner* — Mike Anderson
*Assistant Examiner* — Brandon M Duck
(74) *Attorney, Agent, or Firm* — Morgan, Lewis & Bockius LLP

(57) ABSTRACT

Internet software as a service (SaaS) platform and methodology for generating targeted bond recommendations to institutional fixed income investors that are customized to each buying institution's unique investment strategy, and provides selling institutions with demand information on each cusip they need to sell. The methodology incorporates sophisticated machine learning algorithms, decision trees, and clustering techniques from data science that quantify similarity between bonds. The system can then effectively utilize the calculated bond similarity to make targeted bond and market color recommendations, optimize bond search tools, and provide much needed intelligence into the antiquated search tools currently used in bond markets. The system will reduce or eliminate tedious and time consuming search tasks for bond buyers, and provide bond sellers with valuable pre-trade information, transparency, and a means of connecting with the highest demand in the market on positions they need to sell.

13 Claims, 11 Drawing Sheets

(5 of 11 Drawing Sheet(s) Filed in Color)

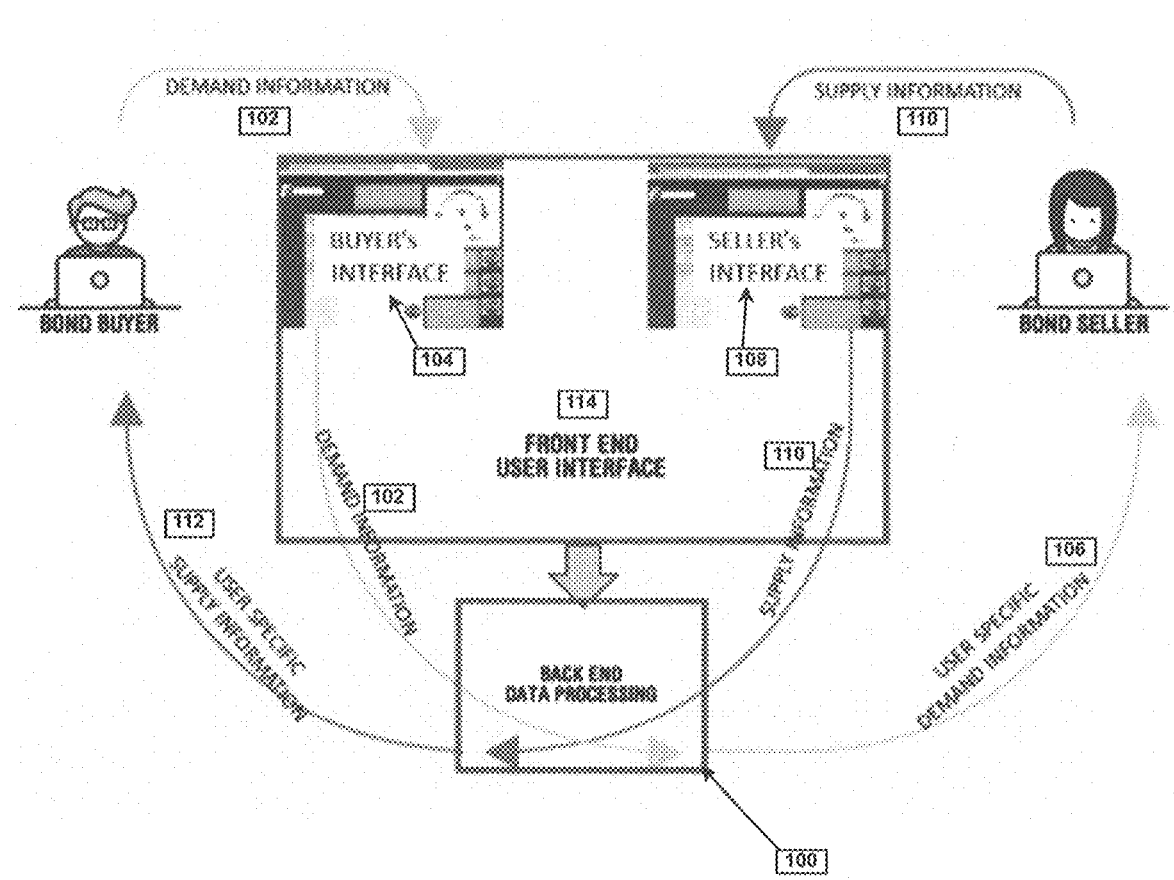
Figure 1. SYSTEM INFORMATION FLOW DIAGRAM

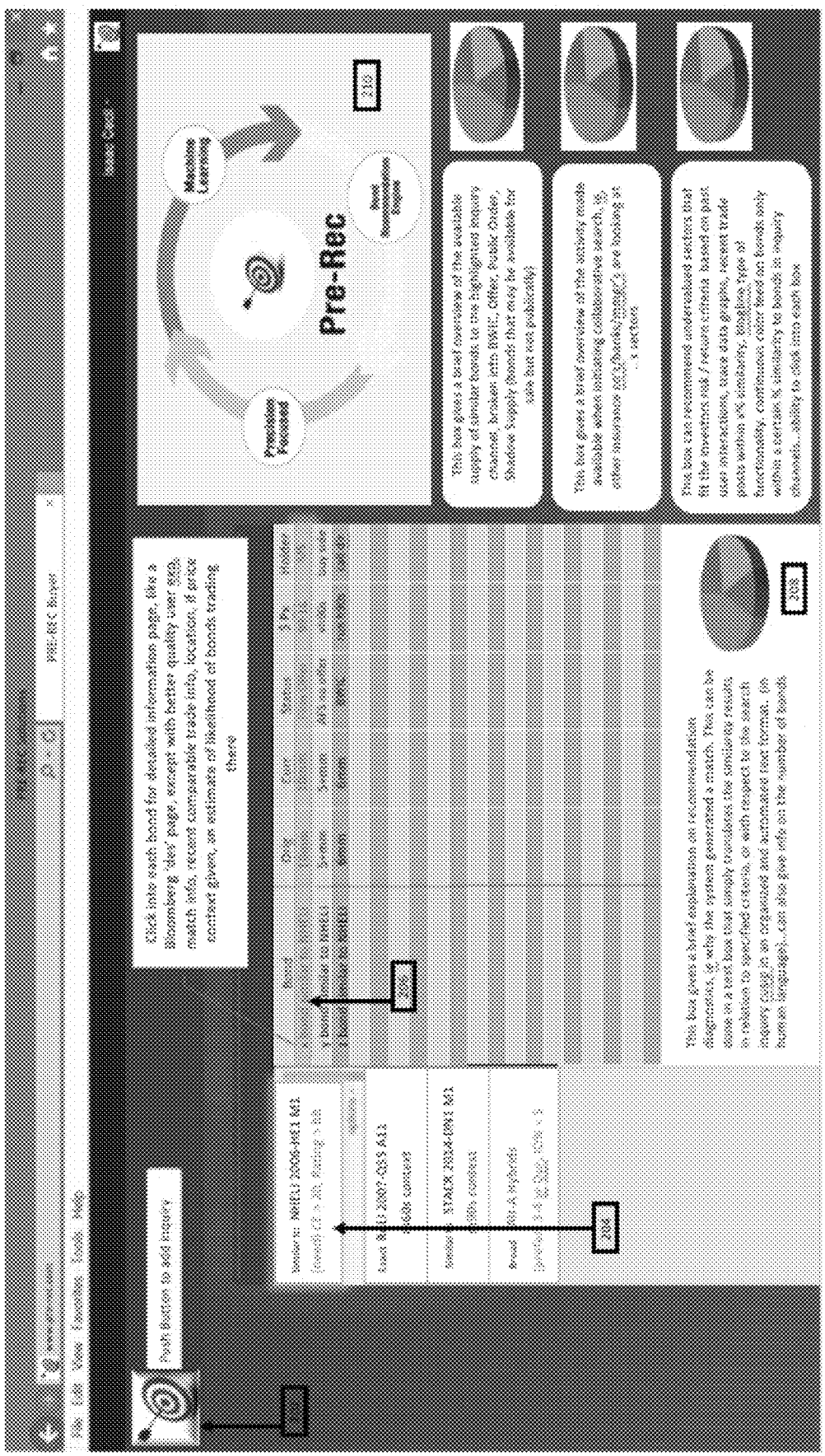
Figure 2. Interface Concept

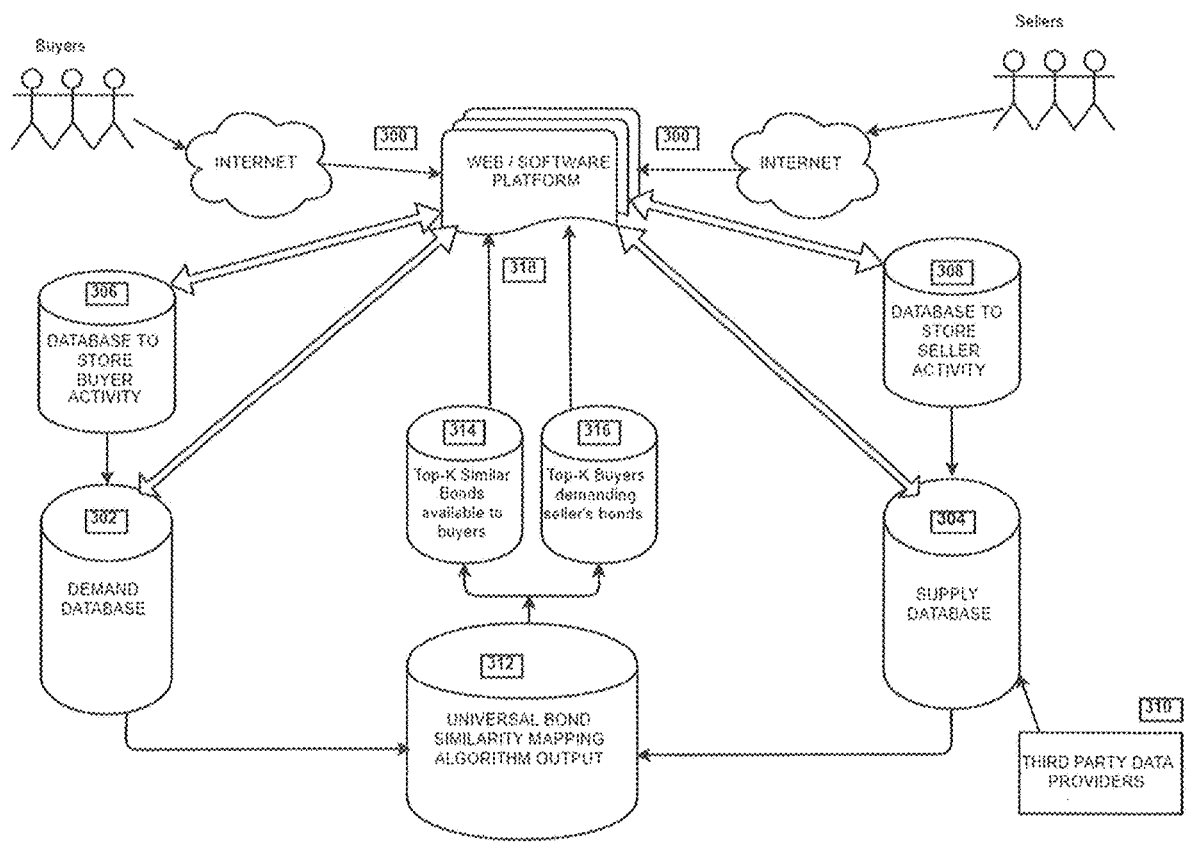

Figure 4. Universal Bond Similarity Mapping Process
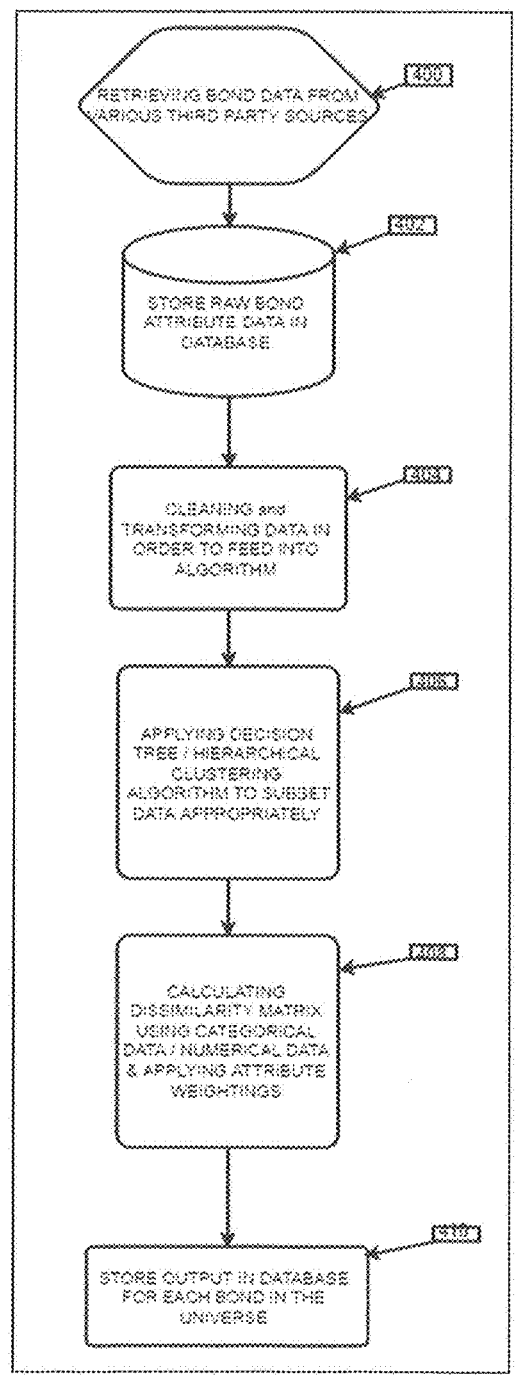

Figure 5. Retrieving Similar Bonds for Buyers Flow Chart
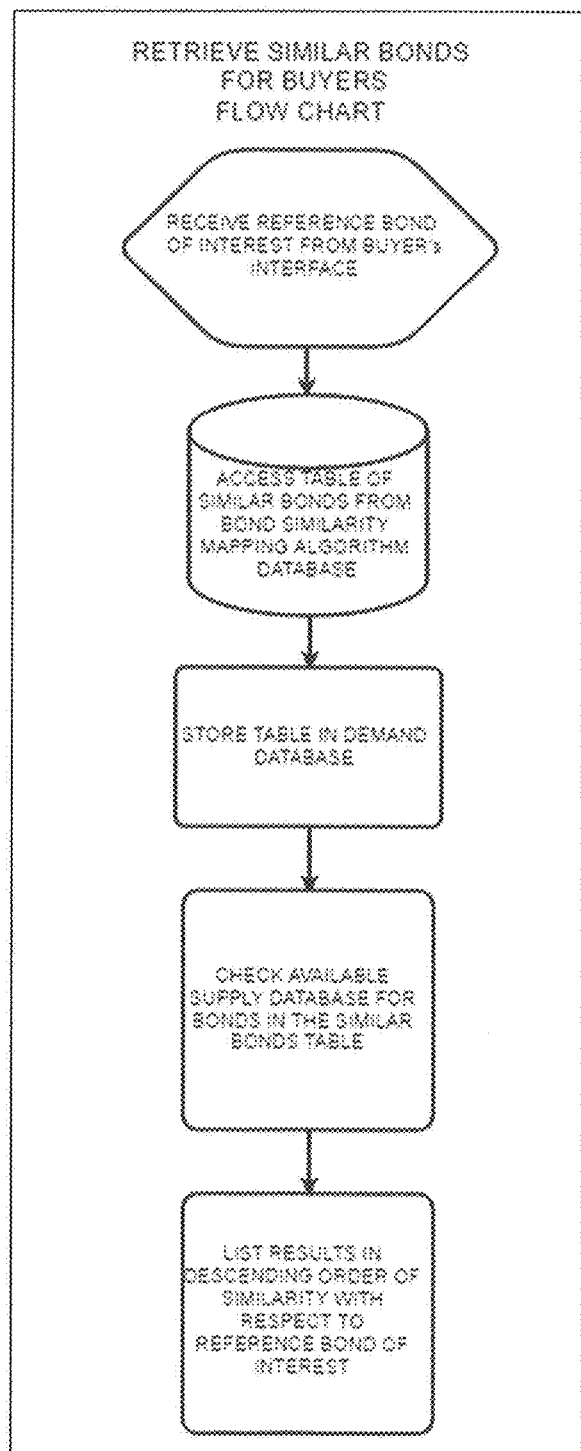

Figure 6. Retrieving Demand Information for Sellers
Flow Chart
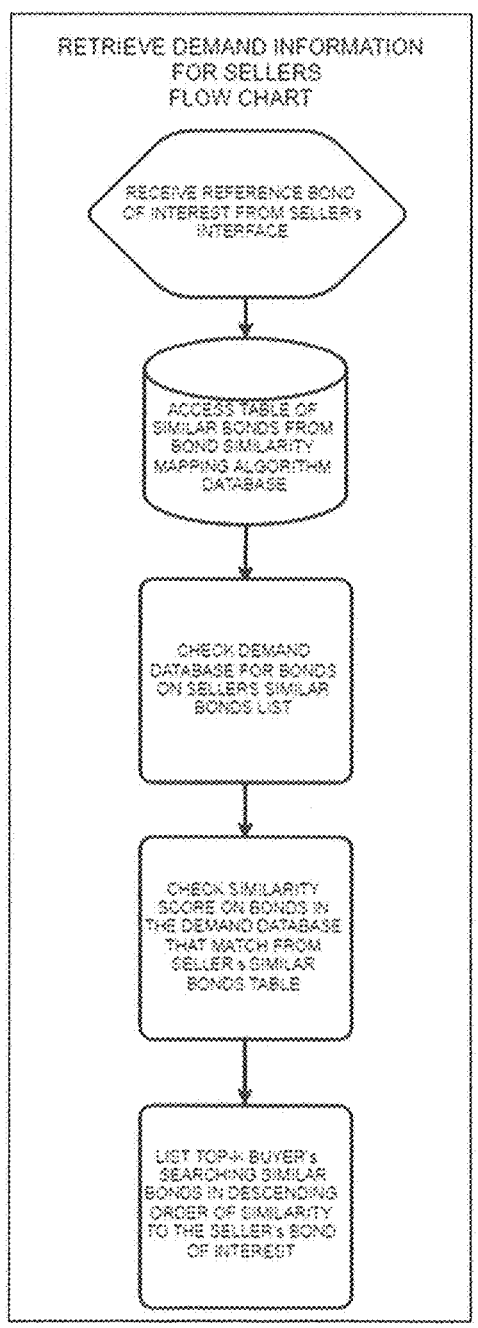

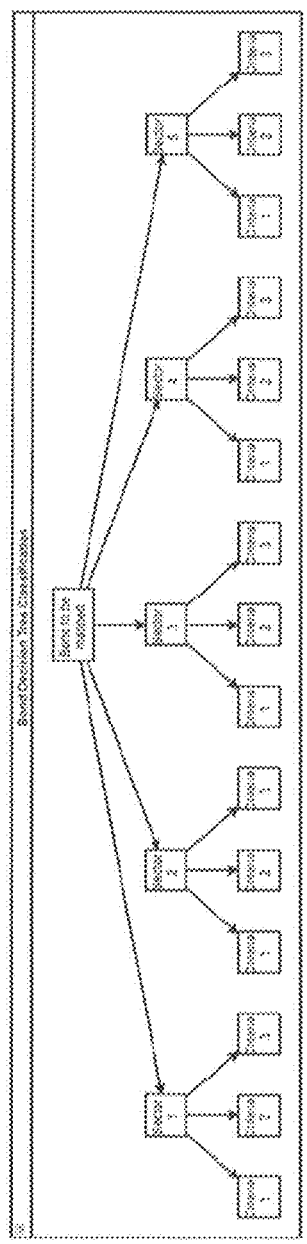
Figure 7. Decision Tree Classification Illustration

Figure 8. Hierarchical Clustering Illustration
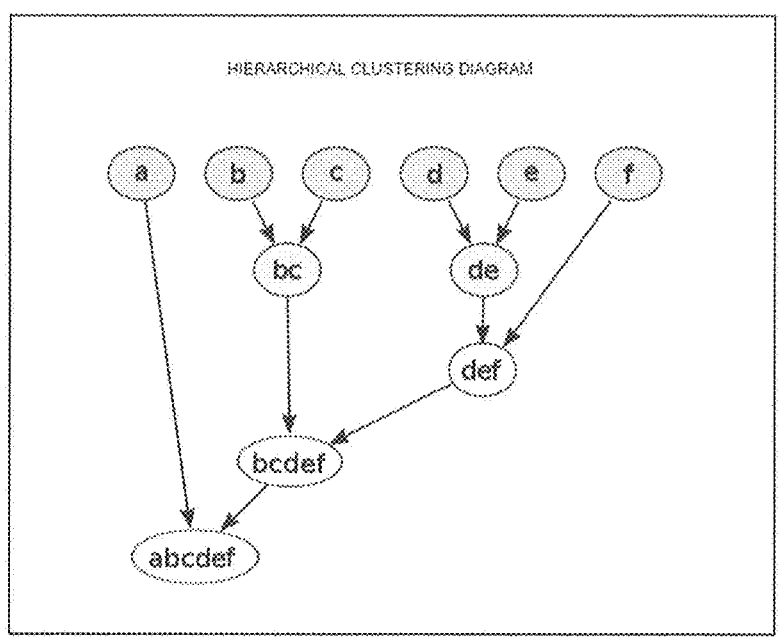

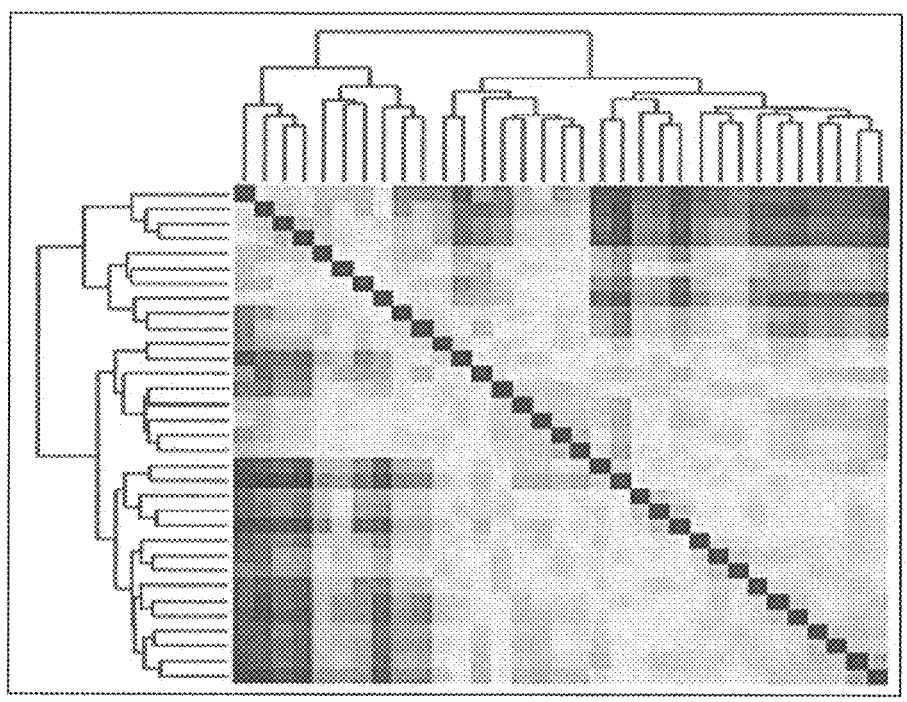
Figure 9. Dissimilarity Matrix / Hierarchical Clustering Illustration Figure 10. Example Bond Dissimilarity Matrix Calculation

| BOND DISSIMILARITY MATRIX | | | | | | | | | | |
|---|---|---|---|---|---|---|---|---|---|---|
| CUSIP | 073877AQ5 | 073879BC1 | 073877BU5 | 073879FM5 | 07384YUL8 | 07384YPF7 | 07384YVJ2 | 073879EZ7 | 07384YNE2 | ... |
| 073877AQ5 | | 0.130 | 0.529 | 0.500 | 0.199 | 0.188 | 0.083 | 0.149 | 0.125 | ... |
| 073879BC1 | 0.130 | | 0.641 | 0.621 | 0.195 | 0.183 | 0.213 | 0.262 | 0.217 | ... |
| 073877BU5 | 0.529 | 0.641 | | 0.079 | 0.727 | 0.648 | 0.603 | 0.565 | 0.547 | ... |
| 073879FM5 | 0.500 | 0.621 | 0.079 | | 0.648 | 0.676 | 0.541 | 0.639 | 0.609 | ... |
| 07384YUL8 | 0.199 | 0.195 | 0.727 | 0.648 | | 0.174 | 0.124 | 0.252 | 0.207 | ... |
| 07384YPF7 | 0.188 | 0.183 | 0.648 | 0.676 | 0.174 | | 0.175 | 0.173 | 0.128 | ... |
| 07384YVJ2 | 0.083 | 0.213 | 0.603 | 0.541 | 0.124 | 0.175 | | 0.133 | 0.113 | ... |
| 073879EZ7 | 0.149 | 0.262 | 0.565 | 0.639 | 0.252 | 0.173 | 0.133 | | 0.045 | ... |
| 07384YNE2 | 0.125 | 0.217 | 0.547 | 0.609 | 0.207 | 0.128 | 0.113 | 0.045 | | ... |

Figure 11. Sample Securitized Bond Data

| Cusip | Shelf | Vintage | Deal | Class | Room | Coupon.Type | Coupon.Index | Tranche.1 | Tranche.2 | Tranche.3 |
|---|---|---|---|---|---|---|---|---|---|---|
| 41165BAD2 | HVMLT | 2007 | 6 | 2A1B | Alt-A | FLOATING | LIBOR01M | FLT | STEP | AFC |
| 41165BAE0 | HVMLT | 2007 | 6 | 2A1C | Alt-A | FLOATING | LIBOR01M | FLT | STEP | AFC |
| 411640AA3 | HVMLT | 2007 | 7 | 1A1 | Alt-A | FLOATING | US0001M | FLT | STEP | AFC |
| 411640AB1 | HVMLT | 2007 | 7 | 2A1A | Option Arm | FLOATING | US0001M | FLT | STEP | AFC |
| 411640AC9 | HVMLT | 2007 | 7 | 2A1B | Option Arm | FLOATING | US0001M | FLT | STEP | AFC |
| 411640AR6 | HVMLT | 2007 | 7 | R | Option Arm | FIXED | FIXED | RESIDUAL | 0 | 0 |
| 126671NS1 | CWL | 2002 | BC1 | A | Subprime | FLOATING | LIBOR01M | FLT | STEP | 0 |
| 126671NW2 | CWL | 2002 | BC1 | AIO | Subprime | FIXED | FIXED | IO | NTL | 0 |

Fig. 11a – Categorical Data

| Cusip | CE | CE.DQ | Thick | Factor | Loan.Count | ALS | Coupon | Current_PER | GWAC | WALA |
|---|---|---|---|---|---|---|---|---|---|---|
| 41165BAD2 | 2.11 | 0.13 | 0 | 0.357599 | 298 | NA | 1.00944 | 84.26 | 3.3665 | 120 |
| 41165BAE0 | 0.39 | 0.02 | 0 | 0.03558 | 298 | NA | 1.05944 | 84.26 | 3.3665 | 120 |
| 411640AA3 | 0 | 0 | 100 | 0.338347 | 728 | 282288 | 1.77833 | 85.42 | 3.5372 | 118 |
| 411640AB1 | 28.62 | 2.08 | 71.38 | 0.349408 | 682 | 588195.8 | 1.77833 | 86.23 | 3.46 | 118 |
| 411640AC9 | 0 | 0 | 28.62 | 0.336234 | 682 | 588195.8 | 1.77833 | 86.23 | 3.46 | 118 |
| 411640AR6 | 0 | 0 | 0 | 0 | 1410 | 472748 | 0 | 85.91 | 3.4891 | 118 |
| 126671NS1 | 0 | 0 | 0 | 0.017258 | 96 | NA | 1.43833 | 78.72 | 6.1532 | 184 |
| 126671NW2 | 0 | 0 | 0 | 0.014642 | 96 | NA | 0 | 78.72 | 6.1532 | 184 |

Fig. 11b – Numerical Data

FIXED INCOME RECOMMENDER SYSTEM

CROSS-REFERENCE TO RELATED APPLICATIONS

This application claims priority to U.S. Provisional Patent Application No. 62/492,419 filed May 1, 2017 entitled "FIXED INCOME RECOMMENDER SYSTEM", which is incorporated by reference herein in its entirety.

FIELD OF THE INVENTION

The invention is in the field of financial technology, data science, and business analytics, and intended to be used by institutional level fixed income investors, i.e., banks, insurance companies, money managers, pension funds, asset management firms, and broker dealers. The invention is more specifically a web software based platform driven by a recommender system technology that can supplement current market infrastructure and facilitate enhanced connectivity between bond buyers and sellers. The recommender system implements a method of quantifying similarity, or relatedness, of a particular bond to all other bonds in a sector universe of bonds. The similarity metric is then used to generate customized product and content recommendations, optimize bond searches, reduce search and selection times, create connections between buyers and sellers, and provide sellers with valuable sources of demand on the cusips they need to sell at any point in time.

SUMMARY OF EMBODIMENTS OF THE INVENTION

Embodiments of the invention are directed to a computer implemented method, system, and non-tangible computer readable medium comprising an Internet software as a service platform. The platform is configured to quantify similarities between fixed income securities using a plurality of defining bond attributes to generate targeted bond recommendations to institutional fixed income investors, where in the targeted bond recommendations are customized to each buying institution's unique investment strategy and provide selling institutions with demand information on each fixed income security they need to see. The quantifying involves applying one or more machine learning algorithms, decision trees, and/or clustering techniques to calculate a bond similarity comprising a distance of each bond with respect to the entire universe of available bonds; and applying the calculated bond similarity to make targeted bond and market color recommendations, optimize bond search tools, and provide intelligence.

BRIEF DESCRIPTION OF THE SEVERAL VIEWS OF THE DRAWINGS

The patent or application file contains at least one drawings executed in color. Copies of this patent or patent application publication with color drawing(s) will be provided by the Office upon request and payment of the necessary fee.

FIG. 1 illustrates the information flow across the system;

FIG. 2 illustrates the interface concept which acts as the collection mechanism for demand and supply information into the system;

FIG. 3 is a system infrastructure diagram showing how information will be stored and used across various components;

FIG. 4 is a flow chart describing the process used to generate the universal bond similarity mapping algorithm;

FIG. 5 is a flow chart describing the process for generating similar bonds for the buyer's interface;

FIG. 6 is a flow chart describing the process for generating demand information for the seller's interface;

FIG. 7 is an illustration of the decision tree methodology used to classify each bond prior to executing dissimilarity matrix calculations;

FIG. 8 is an illustration of the hierarchical clustering techniques used to cluster similar bonds prior to executing dissimilarity matrix calculations;

FIG. 9 is an illustration of the dissimilarity matrix calculation used to quantify similarity;

FIG. 10 illustrates the dissimilarity calculation output on a small subset of cusips; and FIGS. 11a and 11b illustrate exemplary securitized bond data.

DETAILED DESCRIPTION

It is commonly known and acknowledged by institutional bond market participants, i.e. banks, insurance companies, hedge funds, money managers, pension funds, other large financial institutions, and regulators of these markets, i.e. SIFMA, that diminished liquidity poses a meaningful problem in the post 2008 financial system. Diminished liquidity is a problem because it hurts investor's returns when they are unable to efficiently exchange their investment positions for cash. It is agreed across the market that alternative solutions must be found to mitigate this issue, and that technology is a potential solution to better connect supply with demand. In the more illiquid sectors of fixed income, diminished liquidity is an even bigger problem. Very few technology based solutions, ie, alternative trading systems, or electronic trading platforms have either attempted or successfully penetrated illiquid sectors of fixed income, ie distressed corporate debt, subordinated debt, municipal bonds, and various sectors of securitized products due to the level of complexity of each bond, and fragmented nature of the market. Furthermore, informational inefficiencies in fixed income markets contribute to illiquidity because valuable trade information is communicated over the telephone, emails, and private chat rooms, and never gets utilized to drive connections that could add value for both buyers and sellers. By incorporating recent advances in data science, machine learning, and predictive analytics, an application that adds value to all bond market participants is now achievable.

The largest and most influential technology and e-commerce companies in the world have achieved massive success by making targeted content and product recommendations to each customer based on each user's specific needs and preferences. The technologies driving these customized recommendations are commonly known as machine learning recommendation engines, and they have not yet been implemented in institutional fixed income markets in a way that adds value to the market as a whole. One reason they have not been implemented is that many of the recommender systems used in consumer markets, like movies, music, or other consumer products often generate a wide range of potential product or content recommendations to users, some of which may not be relevant to the user's needs or interests at any point in time. In a consumer product setting, the failure to generate accurate recommendations does not deter the user from shopping, or using the platform in the future. However, in an institutional investing context, this randomness in recommendation results would not be acceptable, and could potentially waste the user's time in simply trying to understand why the recommendation was provided. The ability to generate recommendations with the level of precision necessary to add value to institutional fixed income investors requires greater sophistication in applying the algorithms that quantify similarity across fixed income products. By adding a greater level precision, and accuracy to the recommendation results, these technologies can help institutional level investors cut through the daily overflow of disparate information sources that compose the available supply, allowing quick and efficient location of the bonds that fit their unique investment preferences and criteria. Furthermore, using a more precision based approach to making recommendations and quantifying similarity, the algorithms can be used to connect sellers with sources of demand in the market, helping to find the specific buyers for positions they need to sell. The proposed platform and methodology can supplement the current market infrastructure and allow for an overall greater degree of connectivity across the market place.

The recommender system uses a combination of decision trees, hierarchical clustering techniques, and machine learning algorithms, collectively termed, The Universal Bond Similarity Mapping Algorithm, to search the entire available supply of bonds, consisting of the public and shadow supply, and drive precision focused data driven bond recommendations which are highly specific to each user's unique investment needs. The Universal Bond Similarity Mapping Algorithm effectively quantifies the similarity between each bond in the universe and can use the algorithm output to drive intelligence. Bond buyers using this recommendation engine can set up multiple search channels for inquiry that continuously probe the available supply, and return a customized queue of bonds ranked in order of descending similarity to a user defined reference bond, broadly defined parameters, or collaborative based searching techniques. As the buyer's inquiry channels continuously search the supply, information can be carefully and precisely disseminated to sellers giving live demand information on each position they have loaded into the application as 'available for sale', and a means to connect with the demand at any point in time.

The invention is a market neutral software platform that adds value to all participants in the securitized debt markets, ie, investors of all size and strategy, and also the broker-dealer community. The system will add value by reducing tedious time consuming searching tasks for those that want to buy bonds, and efficiently provide sellers with valuable demand information and a means of connecting with those demanding their positions. This allows sellers to gain pre-trade market transparency and achieve best execution possible. The system accomplishes this while fitting directly into the current market infrastructure without requiring drastic changes to market participant's standard practices and trading styles, which is required by other leading technology driven trading solutions.

The proposed invention and solution to organizing the everyday chaotic and dislocated flood of bond information into a format that is precision focused, user friendly, and custom tailored to the specific needs of each market participant is a SaaS based recommendation engine. The web based platform adds value to buyers by instantaneously processing the entire supply of options and narrowing down only the bonds that that fit their unique criteria, and adds value to sellers by providing real or near real time demand information on bonds they would like to sell. The application has a dual user interface, namely, a buyer's interface and a seller's interface, where both interfaces feed the same back end data storage, processing, and recommendation engine. The user defined information input into the buyer's interface is first processed by the back end and then carefully channeled into sellers with similar bonds loaded into the seller interface. As sellers load their 'available-for-sale' positions, they are included in the available supply to be populated in the buyer's respective inquiry channels, creating a constant feedback loop between buyers and sellers.

From the buyer's interface, a user can define multiple separate inquiry channels at a time, replicating the nature of typical institution's investment search and selection process. Once the inquiry channels are defined, the system continuously probes the entire supply of available bonds, and then ranks the bonds in order of similarity by using the Universal bond similarity mapping algorithm methodology. Each channel can be defined using the following three forms of search: inputting a reference cusip, or list of cusips, parameter search where the user defines broad bond characteristics, and collaborative based search where the user can search based on what other market participants are searching at any point in time. The technology can learn from positions the institution has already purchased, "Liked", or has previously searched in order to continually optimize the list of recommendations and learn user preferences. The more information the user provides the system when defining each inquiry, the more accurate the recommendations, resulting in a higher probability that the recommendations will fit for the user's portfolio.

From the seller's interface, the platform uses the similarity scoring algorithm to provide active indications of interest on exact cusip matches, substantially similar profiles, and overall levels of demand in the market on each position the seller needs to sell. The seller can load a single bond or a list of bonds into the seller interface, and the algorithm provides a detailed summary of the nature and depth of the demand on each position, also revealing whether it's an active bid, a price range, or simply that buyers are searching similar cusips without specifying a price. This is done using the proprietary similarity scoring methodology, where the seller's positions are matched with those generated by the buyer's inquiry channels which then generate a summary statistic representing the demand on each position the seller wants to sell. The system will then provide a list of prospective buyers ranked by level of similarity and nature of demand, and an overall probability based likelihood of a mutually beneficial trade getting done. The system provides a list of options on both the buyer's and seller's interfaces allowing users to choose a mutual dealer to facilitate negotiation, pursue further price discovery, or trade through the platform.

The dual user interface is the main portal for defining channels of inquiry, inputting available for sale bonds and acts as the sole means of collecting supply and demand information from each user on the system. The buyer's interface allows users to define their respective inquiry information by implementing a combination of different types of searches consisting of reference bond input, constraint based definition, and basic filtering. Most, if not all search tools in fixed income markets today only allow for sorting, filtering and constraint based bond searches, and provide no intelligence in optimizing search results, recommending substantially similar profiles, or uncovering valuable connections between buyers and sellers. The entire system described herein, represented in FIG. 1, which illustrates the flow of information through the back end data processing engine 100 is able to sort and filter like the antiquated tools with the additional ability to provide intelligence to bond searches. Demand information 102 from buyers, in the form of bond inquiry inputs are fed into the system through the buyer's user interface 104, also illustrated in FIG. 2, and stored in a demand database 302, which is shown in the system infrastructure diagram of FIG. 3. Once the demand information is processed and appropriately stored, it can then be channeled as user specific demand information 106 into users on the sellers user interface with similar or relevant bonds 'available-for-sale'. The seller's user interface 108, can function in a reciprocal way as sellers load their available for sale bonds into the system as supply information 110, stored in the supply database 304 which is then processed and channeled as user specific supply information 112. This information flow becomes more robust from network effects as more users join the system, and a more diversified user base adopts the technology. An important feature of the system which is designed to overcome obstacles associated with network effects systems, is that the software can function as a stand-alone system for buyers, as a substantial portion of the daily supply inventory can be fed into the system through a third party data feed 310, or captured directly from the dealer community.

The user interface, illustrated in FIG. 2, is the primary method for defining inquiry channels and highly streamlined for user experience and simplicity. The automated buy inquiry setup assistant, which can be initiated by clicking the bulls-eye logo 202 in the upper left of the UI, walks the user through the inquiry definition process, allowing the user to define important parameters like dollar amount minimums, levels of demand, and specific product types to be searched. The inquiry definition process will be explained in greater detail in a later section focused on inquiry definition, as this process is integral to effective information collection from the user. There is also a secondary option for manual entry that allows the user to skip the automated setup assistant to define their respective inquiry channels from dialog box of comprehensive characteristics and parameters. As the user inputs their unique and critical information to define each of the inquiry channels, each data point is collected into respective user activity databases 306, 308 and used to power the classification methods that locate and present only the bonds of interest. This type of recommender system is commonly termed a 'knowledge based' recommender system, because the user needs to apply specific details about each inquiry being defined. This method is appropriate for institutional level investors as they generally have a high degree of domain knowledge in the specific sectors of interest.

The various methods of inquiry channel definition, levels of information, and degrees of specificity that can be used to define each inquiry channel play an integral role in how the recommendation engine narrows down the bonds of interest for that respective user. As a user applies a greater degree of specificity in defining the inquiry channels, the search algorithm adapts accordingly, applying filters to the results of the more computationally intensive similarity scoring and ranking operations. The other capabilities of this system, outside of the traditional search methods of a knowledge based system are the ability to use a collaborative based search, and nearest neighbors search. Using each of these respective means of inquiry definition an institution can search for bonds by what other similar 'participating' institutions are searching, and also the most substantially similar bonds with respect to a bond of interest. These additional forms of search, especially a nearest neighbors based search uses the similarity metric that is generated by the Universal Bond Similarity Mapping Algorithm 312 to drive customized recommendations, optimize searches, and uncover connections between buyers and sellers that would otherwise be unnoticed using traditional search methods, and simple cusip matching.

Buyer Inquiry Definition Methods

Three separate methods of definition can be used to define inquiries, i.e. input demand information 102 on the buyer's interface 104. Those methods are, cusip based nearest neighbor, parameter based, and collaborative based search. Most bond search tools available today only allow for simple cusip matching, and sorting and filtering to locate bond profiles. Collaborative based search requires the least amount of information from the buyer and requires no domain knowledge, which can result in the least targeted and broadly varying subset of options. This method allows the user to request search results similar to what specified subgroups of users are searching for, ie. return bonds other banks or insurance companies are currently searching. This allows the buyer to see examples of bonds other participants in certain areas of the financial industry are searching at any point in time. This form of search can be customized by the user, for instance, the user can initiate the collaborative search and request to see bonds other 'banks' or 'insurance' companies are searching, and constrain results to characteristics like: 'bond type=Agency MBS', and 'duration=3 year' allowing greater control over results. This type of search is only enabled when other buyers in the marketplace specifically allow for their searches to be used in a collaborative search capacity. An example of when an institution may choose to share their searches in a collaborative capacity may be after an institution is finished putting on a trade and no longer concerned about adverse price movements while adding the position. Once the position is established, it may even be beneficial to that institution in terms of price appreciation to allow other similar market participants to see what types of bonds they are adding.

Parameter Based Inquiry Definition

The next form of inquiry channel definition is the parameter based search used by buyers that do not have a specific bond of interest but know either sector specific parameters of bonds they would like to buy. This type of search is inherently a broad based search strategy and generally associated with a knowledge based recommender system, however depending on the number of parameters used to define the inquiry, can either be just as effective and precise as a cusip based search, or if there are excessive constraints applied, too few results can be generated. This form of inquiry uses simple filtering and sorting techniques to generate bond recommendations.

The Cusip Based Inquiry

The cusip based inquiry definition can generate two different types of results. One simply returns exact matches, and is accomplished using simple unique identifier matching, and the other returns nearest neighbors to a bond of known interest. The nearest neighbors approach is more technical, and requires intensive offline computation in generating tables of substantially similar options for each bond in the universe.

Exact Cusip Matches

The system allows the user to define exact cusip matches by inputting a single cusip, or batch input. If the user is only looking for exact matches, multiple cusips can be input into the system under one inquiry channel. This may be effective if a buyer wants to receive notifications and trade color on positions they own, which may be an entire portfolio of bonds at the same time. The reason multiple cusips can be loaded in this batch input manner is that the system is simply storing the list of cusips in the demand database 302, searching, and matching unique identifiers. Computation using this method is minimal, and can quickly locate connections when they exist.

Nearest Neighbor Cusip search Description

The nearest neighbors search can be utilized when the buyer can use substantially similar alternatives to a known bond of interest. When the system is directed to use this type of search, the automated inquiry setup assistant begins by asking the buyer if there are hard requirements that must be considered in conjunction with the specified cusip. A few examples of hard requirements or stipulations might be the bond's ratings must be above a certain threshold, loan count greater than a specified number, or duration must be between certain parameters, to name a few of the many characteristics that could be constrained. To facilitate establishing those hard requirements, a search field with autocomplete functionality will bring up Boolean operators to quickly and easily set specific attribute ranges, continuing from the example, Ratings>=BBB-, Loan Count>150, Duration is between 4 and 5 years. The bold text represents example attributes that may be defined using the Boolean operators. These user defined inputs prevent unwanted results from being generated, and allows a more refined subset of bonds to be considered in the similar bonds table. Once a subset of bonds from the universe that fit the user defined criteria has been established, it will be sent to the demand database 302 for storage and further processing by the back end data processing 100 and recommendation engine. The back end processing component will then check the available supply database 304 for bonds that are also in list of similar bonds from the buyer, and then subsequently rank them accordingly in the queue under that respective inquiry channel. When a buyer wants to understand why a certain bond was recommended, they can simply click a bond to open a detailed view dialog box with the matching diagnostics information.

Cusip and Price defined search

The most targeted and actionable variation of the cusip search can be established by including a desired dollar price, bid indication, or contextual indication of interest indicating the desired price level needed to transact. Defining a search inquiry with a cusip and pricing context is the highest level of specificity that can be defined and also represents the highest level of demand when communicating interest to the seller's interface. This form of inquiry also adds an additional layer of complexity to the similarity score computation due to factoring in price, yield, spread, duration and other dynamic characteristics of the bond that depend on market prices and yields. If the bonds in question, or substantially similar bonds, i.e., those scoring a high level of similarity, are appropriate to engage, a chat between the buyer and seller can be established directly, intermediated through a mutual dealer, or a dealer of the buyer's choice if there are no mutual dealers. The algorithms and computation used to determine similarity relationships between bonds, assign the proprietary similarity score, determine demand strength scoring methodology and finally the process of ranking the bonds in order of highest to lowest similarity will be discussed in the algorithm computations section.

Buyer Demand Information Collection

In the fixed income marketplace, each buyer has varying degrees of demand needs, and levels of interest in certain products at a given point in time. The degrees of demand can be loosely defined as an immediate need, high demand but not immediate, moderate demand but not chasing, or always looking for this type of profile. As the buyer programs their inquiry channels, they will be given the option to specify their level of demand. This can also be represented in the buyer's willingness to 'put a bid' on the position, or in other words, specify a desired transaction price in defining the inquiry. These varying degrees of demand and interest levels are collected from all of the respective buyer's interfaces, and then communicated to the sellers when the seller's bonds register an appropriate level of similarity tiering, which will be discussed. The information will be controlled in a way that does not reveal the exact position information until both parties involved have acknowledged and confirmed willingness to disclose their respective information.

Seller's Supply Classification Methods

The seller's user interface, which can also be represented by the interface illustration of FIG. 2, allows any seller to post their available for sale bonds, or bonds that they have the potential to sell into the system and receive near real time user specific demand information 106, and indications of interest on each bond, broad demand levels by sector, depth of demand, and a means to connect with the demand. The seller's input methods can be in batch cusip list mode, or individual cusips. This interface is the primary mechanism for bond supply to be added into the system, while other sources of supply information come from a third party data feed 310. This aspect of the system could be beneficial to all market participants, but particularly those who regularly trade, for instance, money managers that trade actively, or dealers that maintain inventories and sell regularly. The system is designed to accommodate even users that might buy or sell infrequently, as the cusip level demand information provided by the system can generate value by giving pre-trade transparency to the seller and generate additional proceeds from selling positions into the highest demand in the market. This added value on one trade can justify the cost of using the system. Furthermore, buyers can simply load their bonds of interest, and the system will capture relevant color, and notify the user when anything pertaining to similar bonds is available for trade in the marketplace. These ancillary tools of market color aggregation will be described in greater detail in a section describing other features of the system.

Seller Classification Process

When a seller loads their positions into the seller's interface, they must affirm ownership and ability to transact in each of the cusips posted. Once the seller has affirmed and loaded the bonds and face amount they are willing to sell, they can classify each cusip manually, or as a batch under four distinct categories, firm offers, contextual sell indications, bonds for sale with no price indication, and looking for color. The seller's positions remain anonymous, and furthermore retain the ability to control when a bond is shown to buyers to protect the position and prevent adverse market movement. This is accomplished by allowing the seller to set the conditions when the position will be shown to a prospective buyer. This can be done by allowing the seller set parameters or receive notification when a bond on the available for sale list receives a certain level of demand or inquiry, which is defined by the system's similarity matching engine. This allows the seller to grant permission for those with specific buy inquiries to be granted access to see the bonds if a certain similarity score is attained. When a seller chooses to manually control the display of information in this manner, they only receive general demand information on the cusip if the specific conditions are met. Comparable to the functionality on popular social media and web based business networking services allow for users to remain a certain level of anonymity, when viewing other user's profiles, but they are only allowed to see high level information on users viewing their profiles. (LinkedIn information disclosure Functionality). Controlling information in this manner is important to preventing information leakage in the bond markets, which can cause adverse price movements for both buyers and sellers.

This is accomplished by generating a demand score for each position based on these varying factors of interest and demand from the buyers in the market. The demand score is based on how many institutions are looking for similar bonds, the various degrees of similarity of bonds being searched, whether the buyers have bid's, contextual indications of interest, or simply a low or moderate level of demand. Once the information is gathered for each bond loaded into the seller's interface, an overall demand score is assigned to the position. The overall score is composed of the number of buying institutions with similar bonds programmed into the buyer's interface at any point in time. The seller can click into the components of the score, and engage the buy inquiry with the highest likelihood of producing a mutually beneficial trade. In order to generate the likelihood of a trade occurring, the bonds being searched by each of the buyer and seller are assigned a tier generated from the Universal Bond Similarity Mapping Algorithm. When a buyer and seller are connected with bonds that both fall into tier 1 categories, the highest likelihood of a trade exists between the two. When a tier 1 and tier 2 match are determined, a slightly less likely trade situation exists, and so on down to two tier 4 matches are established, which results in the lowest likelihood of generating a trade, but the connection exists based on the buyer's and seller's bond input characteristics merit some level of commonality. This may be as basic as the buyers and sellers search bonds sharing at a minimum the same coupon type, collateral, and position in the capital structure, ie senior, or subordinated.

When assigning a demand score for each buyer, the bond input defining the buyer's inquiry channel references the Universal Bond Similarity Algorithm results and level of demand inputs from the inquiry set up assistant. The similarity score is then used in conjunction with other factors such as the buyer's stated level of demand, trade history, and pricing indications from the buyer and seller to generate a logistic regression based probability of transacting, 1 being a 100% likelihood of doing a trade, 0 being no chance of transacting. Once the seller has an understanding for the buyer's level of interest, they will be given a list of options to facilitate the transaction. Those options may be, any of, connect with a dealer with mutual connection between both buyer and seller, a dealer of choice if there are no mutual dealers, or conduct the trade through the system if no negotiation is necessary.

Back End Data Storage and Processing

The back end data storage, processing and recommendation components are the drivers of the intelligence, and facilitate the value add of the system. Information is pulled into the back end from multiple sources. The user base, via the user interface, 300, is constantly loading data, buy inquiries come from buyers, and available for sale positions from sellers, and will ideally be the largest contributor of information when the system is at full capacity. The other data sources are for the raw bond data, and supply information which come from various third party sources 310.

Structure of the Data

As mentioned previously, each bond in the structured products universe can be characterized by a vector of n characteristics at any point in time. This number of characteristics, n, can vary based on a number of factors, but generally each bond can be defined by as many as hundreds of characteristics, or as few as one if using the unique identifier, the cusip. This all depends on the level of granularity needed at any point in time. Those characteristics are composed of numerical data, categorical data, and derived data. Most bond information remains static throughout each month until remittance reports are processed which report each bond's collateral performance, for instance the amount of principal balance of the underlying loans have prepaid, defaulted, or liquidated. This data that remains constant during the month, we consider static data, and use this in the universal similarity mapping algorithm. On the other hand, data like bond prices, yields, and spreads are continuously changing based on supply and demand, and yield curve fluctuations, which we term dynamic data. Collectively, each bond can be represented by a vector of data points that allows us to store, process, conduct computation, compare, filter, and sort as needed, in order to classify bonds appropriately.

Cleaning and Transforming Data

Bond data is difficult to process or extract meaningful information in raw format directly from a third party data provider. In many cases, data is incomplete, or inaccurate, and must be thoroughly checked and vetted, and in some cases downloaded multiple times in order to simply get a complete set of data. In some cases, especially dealing with investment related data, it may also be important to use multiple data providers that provide the same data as a means of quality control prior to use for investment purposes. This has been addressed before in securitized fixed income products by using multiple loan data sources, as referenced in Amherst Loan Information Analysis System Patent, reference number U.S. Pat. No. 8,438,096. Looking closer at the types of characteristics present in a typical bond vector FIG. 11, one will see general categorical data FIG. 11a and numerical data FIG. 11b describing bond characteristics such as coupon, and weighted average loan age, subordination levels or credit enhancement in ratios. Some data points are derived from loan pools consisting of thousands of loans, it's common to see statistics like average borrower fico scores, debt to income ratios, and loan performance calculations which are typically in the form of monthly or annualized rates with respect to the outstanding bond balance, such as voluntary prepayment rates. Since the raw collected data is in a format that contains a mix of numbers, letters, rates, and percentages, it is important to transform it into a usable format for computations. Furthermore, in order to apply the data to the machine learning algorithms used, the data must be converted into a format that can be quantifiable. For instance, a universe of non-agency mortgage bonds generally contains five different subsectors of loans, Prime, Alt-A, Subprime, Option-Arm, and then some loan pools have a mix of characteristics. In order to perform large scale calculations on this type of categorical data, numbers must be assigned to each, and then quantifiable relationships must be established between each of those variables. For instance, applying domain knowledge from the mortgage market, practitioners would generalize Prime is closest to Alt-A, Alt-A is closest to Option Arm, and subprime is furthest away in terms of borrower characteristics from Prime. Following this logic, representative numbers must be assigned to the categorical data that appropriately reflects these relationships. This concept will be discussed further in the computations associated with similarity mapping.

Interface Input/Output Overview

As the buyer initiates the process of programming an inquiry channel into the buyer interface, the user is asked to quantify the level of demand through selecting from five choices: immediate need, strong demand, moderate demand, always willing to add this type of profile (at the right level), or low demand, ie, only looking for color. These are general classifiers that represent typical market participants willingness to pay for bonds, and consistent with how buyers typically classify their inquiries in real life. Sellers can specify their willingness to sell a position in a similar capacity by defining the nature of availability on the bonds they would like to sell. Sellers can classify by selecting the following options: immediate need (which will not be displayed to buyer's to prevent adverse price movement), firm offer, contextual sell indication, available for sale, bid in competition, and simply looking for color. This information is important in assigning a logistic regression based demand score, and generally prioritizing supply and demand for buyers and sellers. If no degree of supply or demand is specified, a default value can be assigned which is neutral.

Buyer's Output

Once the system has finished gathering the required information from the buyer inquiry setup assistant, a queue of available bonds, of defined length will populate under the inquiry channel with the basic information on the available bond and the nature of its availability in the market, represented in results output 206. The nature of availability could be any of the following: firm dollar price offer, contextual sell indication, a BWIC bond with a specified bid time, or simply a bond that is available for sale, but no specific sell price indication, which reflects the seller's input mentioned before. The user can select any of the bonds in the queue to conduct further analysis using a separate analytics package of choice, or view a more detailed page showing the nature of the match. The buyer can then take any of three courses of action: send a notification to the seller requesting time for further analysis to be conducted and request for confirmation that the bonds are still available. If available, the buyer and seller can engage directly with a bid or contextual indication of interest, or connect with a dealer of choice to negotiate the trade if additional price discovery is needed.

Nearest Neighbors Input/Output

When a buyer enters an inquiry channel using the nearest neighbors approach the buyer is expressing they can use substantially similar alternatives. Since a cusip search is being used, the system reads the bond type and internally direct itself to the correct product silo for the next actions. The decisions from that point on will depend on the level of specificity given by the user when defining the inquiry channel. For instance, when the user only defines cusip and size, the algorithm produces a broader range of potential results, versus when the user defines a host of other characteristics like ratings, subordination levels, or loan count to constrain the search. The results of the Universal Bond Similarity Mapping Algorithm can then be sorted and filtered based on the user's constraints.

Seller's Interface Input/Output

When the sellers load their bonds into the system, they will be classified by the level of availability, ie, firm dollar price offer, contextual sell indication, or just available for sale bond with no price context. Once these bonds are read into the system, they are directed into their respective silos and tagged appropriately for further processing. As the buyer's inquiry channels are constantly pulling from and searching the available supply, the seller's bonds may be referenced by many separate inquiry channels in some capacity, with each reference having different similarity scores based on the inquiry channel that referenced it. Looking at one example bond from the seller's interface, let's assume this one bond was referenced by five separate buyer's inquiry channels each with varying degrees of similarity and demand. On three of the inquiry channels the bond was referenced to have a tier 2 or better similarity to the each buyer's respective reference bonds, one inquiry channel referenced the bond with tier 3 and one had a tier 4 match. One of the inquiry channels that registered tier 1 similarity score also specified that they had "high demand but not through market". The rest of the inquiry channels that referenced this bond had "moderate demand but not chasing", or "always looking for this type of profile". All of these data points, and number of inquiries are taken into consideration to assign an overall level of demand score on the cusip. When the seller drills down into the components of the overall score, the one with the highest demand will be ranked at the top, and further given a logistic regression derived probability of transacting, where the similarity score, stated level of demand, and buyer's and seller's bid ask spread are the independent variables, and successful transaction occurring, which is a binary event, is the dependent variable. At this point, the buyer and seller can select from a list of options which all the two counterparties to interact directly on Pre-Rec's system to facilitate the trade, or allow a dealer of choice to intermediate a trade.

Description of System Computations

The computations used to quantify bond similarity, assess buyer demand, willingness to sell, and transaction likelihood are accomplished using sophisticated techniques of data science and machine learning, combined with traditional regression based business analytics probability metrics.

These will be explained in greater detail in the following sections.

Universal Bond Similarity Algorithm

The computations used to map similarity across entire sectors of fixed income are composed of a series of decision tree algorithms, hierarchical clustering, and dissimilarity matrices. In combination, these techniques provide a powerful, and efficient way to quantify relationships across a complex fixed income data set which can be used to enhance overall connectivity in the marketplace. The process begins with retrieving bond attribute data from various third party sources, as shown in FIG. 4 item 400, FIG. 3 item 310. The bond data is updated on a monthly basis, and stored in the back end database of the system 100, 402, where it can then be referenced and used for various functions of the platform. The data must then be cleaned and transformed into a format that can be used by the algorithm, which is shown in FIG. 4 item 404, where certain bond attributes must be converted into different formats and related to other bond attributes prior to initiating the algorithm calculations. The Universal Bond Similarity Mapping Algorithm uses and processes the data into intelligence, and essentially drives the value add of the system. The algorithm is only run on a monthly or semi-monthly basis, as the computational resources necessary to facilitate this scale of computations requires advanced processing capabilities. For each bond in the bond universe, the algorithm initiates a decision tree that allows for broad classification, and each branch of the tree allows for more granular classification. This is shown in the decision tree illustration of FIG. 7, representing the bond to be mapped as the base of the tree following a series of decisions to classify the sector, subsector, down to more refined criteria which can further be classified by characteristics such as capital structure, coupon type, and then further within capital structure and coupon type by unique bond's subordination levels, i.e. credit enhancement, factor, and finally collateral information. Once the algorithm has classified the bond being mapped into a very granular subset, it works outward using a hierarchical clustering methodology represented in FIG. 8, with the letters A through F representing individual bonds or very small groups of bonds which all fall into the same classifications from the decision tree algorithm. The algorithm then finds the most similar bonds and continues to group those until there are enough clustered together, which is generally more than 20 unique bonds, to run a dissimilarity matrix calculation. This is represented in the groupings of FIG. 8. The dissimilarity matrix calculation that is run on each of the various levels of hierarchies shown in FIG. 8 is accomplished using machine learning techniques that further process and quantify relationships between the bond to be mapped, and the other bonds in the universe. In order to quantify distance in the categorical information, which is shown in FIG. 11*a*, a technique that can handle these data types, such as the Gower Distance Formula is applied, Gower Distance $$d_{ij} = d(i, j) = \frac{\sum_{k=1}^{p} \omega_k \delta_{ij}^{(k)} d_{ij}^{(k)}}{\sum_{k=1}^{p} \omega_k \delta_{ij}^{(k)}}$$

where $d_{ij}$ is the weighted distance between two rows, i and j, of bond subset x, with p columns. $\omega_k \delta_{ij}^{(k)}$ is a user defined weighting based on each k attribute's significance, and match between the categorical attribute k in rows i and j. To calculate the distance between numerical data, the Euclidian distance is applied, which can be written as:

Euclidian Distance $$d(q, p) = \sqrt{(q_1 - p_1)^2 + (q_2 - p_2)^2 + \ldots + (q_n - p_n)^2} = \sqrt{\sum_{i=1}^{n}(q_i - p_i)^2}$$

Where p, and q are separate bonds, and n is the number of numerical attributes to be included in the calculation. In the case of bonds, examples of these numerical values are shown in FIG. 11*b*, which include characteristics like capital structure information, credit enhancement, and collateral information which summarizes loan pool characteristics like weighted average coupon, and weighted average loan age. When calculated in matrix form, the output can be illustrated in FIG. 9, which shows the relationship between the hierarchical clustering technique, and the dissimilarity matrix calculation. FIG. 10. Shows a small subset of a dissimilarity matrix calculation output for only 10 sample cusips. In many cases these matrices can be over 1000×1000 dimensions (rows×columns), and as few as 20×20 dimensions. The output of the dissimilarity matrix generates a numerical metric that quantifies similarity with respect to the bond being mapped. This metric can then be used for many purposes such as recommendations, search optimization, pricing of similar profiles, and also connecting buyers and sellers of bonds with similar characteristics.

Similarity Tier Assignment

Once the dissimilarity matrix calculation has completed for one bond, the output result is an ordered list of the most similar bond profiles in descending order of similarity score. Again, this similarity can be used for many purposes, but to translate the score back into a market usable and understandable format, the bonds must be translated into tiers of similarity with respect to the mapped bond. These tiers of similarity are independent of the dissimilarity matrix calculation, and based solely on broad bond characteristics like bond type, coupon type, capital structure, subordination and collateral characteristics, which allow the algorithm's output to be transmitted in a format that market participants can understand and relate. Furthermore, this function also allows the system to give brief match synopsis on why recommendations were generated, and the nature of the similarity. Tier 1 similar bonds generally share the same issuer, i.e. shelf, coupon payment type, underlying collateral characteristics, capital structure, and tranche type. Tier 2 similar bonds share the same coupon payment type, underlying collateral characteristics, capital structure, and tranche type, which is the same as Tier 1, except removing dependence on the issuer. Tier 3 allows for slightly varying coupon payment type, slightly varying underlying collateral characteristics, slightly varying capital structure, and same tranche type. Tier 4 allows for more broad variations in these characteristics, but maintains a market acceptable relationship for the bond being mapped. This can vary across sectors depending on the number of similar options in each respective product universe.

Generating Similar Bonds for Buyers

As shown in the flow chart in FIG. 5, titled Retrieve Similar Bonds for Buyers, the process is initiated when a buyer programs a buy inquiry into the buyer's interface. Typically, institutions will have anywhere from 3-5 different types of profiles of interest within each sector of fixed income markets, either that they have already purchased for their portfolio, or they know exists and favor the risk return characteristics. Upon programming in their profiles of interest, either by specifying a cusip, or defining broad parameters, as mentioned before in previous sections, the bonds entered will be received by the system 502, and moved into a demand database. Upon moving into the demand database, the results of the Similarity Mapping Algorithm are accessed, and stored in the database along with the client information that entered the inquiry 504. Once stored, this demand information can be used to track similar trades, relevant opportunities and market color pertaining to that specific inquiry channel 506. This is achieved by using the bonds in the demand database to constantly probe the available supply, and return the bonds with the highest similarity score that also coincide with the bonds in the available supply 508. This allows for bonds in the available supply to be returned in a queue ranked in descending similarity order, ensuring that the most relevant bonds are always sent to the top of the priority list for buyers to view and conduct analysis 510.

Generating Demand Information for Sellers

In a similar method described in the previous section illustrating the process for generating similar results for buyers, sellers can input bonds they would like to sell and receive real time demand information on each respective cusip. As shown in FIG. 6, titled Retrieving Demand Information for Sellers, the system receives a reference bond of interest into the seller's interface 602. Once the system receives the bond, the back end data processing component accesses the results of the bond similarity mapping algorithm, and sends the results into a supply database, which is illustrated in FIG. 3 item 304. From the supply database, the similar bonds will be constantly probing the available demand, as shown in 606. Once the demand has been checked, the buyer's with the highest matched similarity will be prioritized and displayed to the seller next to the bond entered into the system. When there are multiple buyers looking for the same type of bond, a summary demand score will be generated which takes into account each respective buyer's inputs with regard to the level of demand, and ranked accordingly.

Generating a Summary Demand Score

In order to prioritize results on the seller's interface, the seller needs to be able to quickly assess the level of demand on each position in order to quickly determine which bonds have the most demand in the marketplace. This can be done by calculating a summary statistic based on the number of buying institutions within certain tiers of matches. The tiering can be based on the similarity tier methodology described above, by aggregating the number of prospective buyers by tiers, and reporting the summary score. This can be further explored by the seller by clicking into each bond loaded into the system allowing for further layers of granularity in assessing the best buy candidates in the marketplace, which are based on buyer's user inputs and classifications of need when programming their inquiries.

Quality of Match/Likelihood to Trade

The system also needs to determine and report an output that summarizes the quality of match between the buyer and the seller. To accomplish this, a logistic regression based score is calculated and assigned for each buyer/seller match in which the seller can use to determine if the situation is worth exploring further and ultimately pursuing as a means of trading the bond. This logistic regression based score is a function of the inputs from the buyer's inquiry definition setup where the buyer defines the level of need or demand by selecting one of, immediate need, strong bid, can always use this profile, neutral, or just looking around. This level of demand is then combined with the level of similarity between the bonds the buyer is looking for, and the bonds the seller is trying to sell. Other variables can be included to refine the score so that:

The probability of generating a mutually beneficial match are modeled with the independent variables, $(x_1, x_2, \ldots x_k)$ $$p(x_1, x_2, \ldots x_k) = \frac{\exp(w)}{1 + \exp(w)}$$

where, $w = a + b_1 x_1 + b_2 x_2 + \ldots + b_k x_k$ and parameters, $a, b_1, b_2 \ldots b_k$, need to be estimated using market data. The independent variables can be any of the similarity score between the buyer and seller's bonds, buyer's demand classification, seller's supply classification, and any input pricing information allowing for inferences on prices and spreads between the positions in question.

What is claimed is:

1. A bond recommendation system comprising:
   a platform server configured to receive, over a wide area network, baseline bond attribute
   data associated with a plurality of fixed income securities, the baseline bond attributed data being in a first format;
   a plurality of trader interfaces coupled to the platform server via the wide area network, the plurality of trader interfaces including a buyer interface and a seller interface;
   a bond database coupled to the platform server through a local area network and populated with the received baseline bond attribute data associated with a plurality of fixed income securities in a first format, and
   a back-end processing engine coupled to the bond database via the local area network and coupled to the trader interfaces via the platform server, the back-end processing engine configured to perform the steps of:
   receiving one or more bond inquiries from the buyer interface that includes at least one of: a single Committee on Uniform Securities Identification Procedures (CUSIP) number, a plurality of CUSIP numbers, a portfolio, and bond attributes in the form of similar bond, exact bond, list or portfolios of bonds, or defined attributes of bonds;
   receiving, from the bond database, bond attribute data associated with a subset of the plurality of fixed income securities, the received bond attribute data being in the first format
   transforming a portion of the received bond data from the first format into a second format;
   on a periodic basis applying a classification decision tree algorithm to the transformed bond attribute data in the second format to assign the subset of fixed income securities into data classifications and subclassifications;
   after applying the classification decision tree algorithm, clustering the subset of fixed income securities into one or more bond clusters according to the data classifications and subclassifications via a hierarchical clustering methodology;
   after clustering the subset, running a dissimilarity matrix calculation offline for the one or more bond clusters that has met a threshold number of fixed income securities, to further associate the fixed income securities in the bond cluster with fixed income securities within the plurality of fixed income securities and to generate a similarity score that quantifies a similarity among the fixed income securities within the plurality of fixed income securities, wherein the dissimilarity matrix calculation includes applying a Gower Distance Formula to the data classifications and subclassifications and by applying Euclidian Distance for numerical data as a function of similarity score and wherein, an output of the dissimilarity matrix calculation includes an ordered output of fixed income securities based on the respective similarity score;
   after the running of the dissimilarity matrix calculation, applying a tiering classification process to translate each similarity score into a market-usable format based upon the second format;
   causing the seller interface to automatically display in a tiered similarity ranking based on a demand level, bonds offered through the seller interface, the demand level being based upon a quantity of buyer inquiries received by the back-end processing engine meeting a similarity score threshold; and
   directly connecting the buyer interface and the seller interface based on the seller selection of one of the automatically displayed bonds via the seller interface, for processing a securities transaction between the buyer interface and the seller interface.

2. The system of claim 1, wherein the similarity tiers are based on bond characteristics including one or more of bond sector, coupon type, capital structure, subordination, tranche type and collateral characteristics.

3. The system of claim 2, further comprising applying the tier classification process that causes the system to generate match synopsis describing rational for generated recommendations that includes quality and similarity information.

4. The system of claim 1, wherein, the subset of the plurality of fixed income securities is based upon searches undertaken via the plurality of trader interfaces.

5. The system of claim 1, wherein the back-end processing engine further performs the steps of:
periodically receiving updated bond attribute data and storing the updated bond attributed data in the bond database to form a new baseline bond attribute data.

6. The system of claim 1, wherein the back-end processing engine further performs the steps of:
generating for the trader interfaces, a display of results from the bond dissimilarity matrix calculation reflecting numeric representation of match quality that includes a similarity tier among a multiplicity of fixed income securities.

7. The system of claim 1, wherein the back-end processing engine further performs the steps of:
based on the similarity score, generating for the trader interface, a data visualization where each element of the dissimilarity matrix includes a graphic representation that when viewed together illustrates relative quantified similarity among the subset of fixed income securities.

8. The system of claim 1, wherein transforming the data includes assigning numerical values to characteristics of the data and establishing quantifiable relationships between fixed income securities based on the numerical values.

9. The system of claim 1 wherein, in response to the bond inquiry, the back-end processing engine further performs the step of:
storing in a demand database, bond data associated with the bond inquiry
receive available bond supply data;
identify from the available bond supply data, available bonds having a similarity score that correlates to the bond inquiry; and
presenting to the trader interfaces, priority ranked relevant bonds among the available bonds.

10. The system of claim 1 wherein the back-end processing engine further performs the step of:
opening a communication chat line between the buyer interface and the seller interface when the similarity score reaches a defined level wherein the communication chat includes one of: a direct connection, a connection intermediated through a mutual dealer, or a connection through a dealer selected via the buyer interface.

11. The system of claim 1 wherein the back-end processing engine further performs the step of:
causing the buyer interface to display of a queue of available bonds, each of the displayed bonds in the queue being selectable to cause the buyer interface to display details about the selected bond.

12. The system of claim 1 wherein the back-end processing engine further performs the step of:
receiving via the seller interface, a causing the seller interface to display a summary demand score based of a queue of available bonds, each of the displayed bonds in the queue being selectable to cause the buyer interface to display details about the selected bond.

13. The system of claim 1 wherein the back-end processing engine further performs the step of: causing the seller interface to automatically display an indication of demand comprising a buyer list displayed in proximity to a reference bond field associated with a reference bond entered through the seller interface, the buyer list including buyer fields ranked by level of demand based on the bond inquiry and the dissimilarity matrix calculation.

* * * * *